United States Patent [19]

James

[11] Patent Number: 5,486,865
[45] Date of Patent: Jan. 23, 1996

[54] DATA DECODER ADAPTED TO DECODE DATA OF DIFFERENT RATES AND/OR ENCODED FORMATS

[75] Inventor: Shirley J. James, Southampton, England

[73] Assignee: U.S. Philips Corporation, New York, N.Y.

[21] Appl. No.: 36,771

[22] Filed: Mar. 25, 1993

[30] Foreign Application Priority Data

Mar. 25, 1992 [GB] United Kingdom .................. 9206495

[51] Int. Cl.$^6$ ...................................................... H04N 7/08
[52] U.S. Cl. ........................................... 348/465; 348/468
[58] Field of Search .................................... 358/145, 142, 358/141, 148, 147, 335; 380/15, 16; 348/461, 467, 468, 465, 473, 474, 477, 478; H04N 7/08, 7/087, 7/089, 7/04

[56] References Cited

U.S. PATENT DOCUMENTS

| 5,113,440 | 5/1992 | Harney et al. ............................. | 380/15 |
| 5,343,300 | 8/1994 | Hennig .................................... | 348/478 |

FOREIGN PATENT DOCUMENTS

| 0306208 | 3/1989 | European Pat. Off. ....... | H04N 7/087 |
| 0337336 | 10/1989 | European Pat. Off. ....... | H04N 7/087 |
| 0176144 | 6/1989 | Japan .............................. | H04N 7/08 |
| 5014869 | 1/1993 | Japan .............................. | H04N 7/087 |
| 9200648 | 1/1992 | WIPO . | |

OTHER PUBLICATIONS

Jünke, Manfred; "A Multistandard Teletext Processor", IEEE Transaction on Consumer Electronics vol. 38 No. 3 Aug. 1992.
James, Shirley; "New Devices for VCR Control Using Teletext Services", IEEE Transaction on Consumer Electronics vol. 38 No. 3 Aug. 92.
Tarrant, D. R.; "Advances in Teletext Decoder Design", IEEE Transaction of Consumer Electronics vol. 35, No. 3 Aug. 89.
IEEE Transactions On Consumer Electornics, vol. 38, No. 3, Aug. 1992, pp. 288–295, New Devices For VCR Control Using Teletext Services.

Primary Examiner—Victor R. Kostak
Assistant Examiner—Nathan J. Flynn
Attorney, Agent, or Firm—Bernard Franzblau

[57] ABSTRACT

A data decoder, for example, for decoding teletext and VPS data, comprises an input signal clamp and synchronizing signal separator circuit which receives a combined video and blanking signal and produces synchronizing pulses for a timing circuit and video signals which are applied to an ADC and a data slicer and clock regenerator (DSCR). Sliced data and clock signals feed an acquisition circuit which acquires selected data which is stored in a memory via a memory interface. A control circuit is arranged to modify the DSCR, acquisition circuit and memory interface dependence upon the type of data detected. The arrangement decoder is set to decode data of one type, for example, teletext, and if no valid teletext data is detected within a given period, for example, four television frames, the control circuit causes the decoder to attempt to decode data of the other type (VPS).

21 Claims, 5 Drawing Sheets

DATA DECODER ADAPTED TO DECODE DATA OF DIFFERENT RATES AND/OR ENCODED FORMATS

BACKGROUND OF THE INVENTION

This invention relates to a data decoder for decoding data transmitted in one or more lines of a field blanking interval of a television signal.

Such decoders are used to decode data at various data rates and having various encoding formats. Examples are teletext and video programming signals (VPS).

Video Cassette Recorder (VCR) control is a new development in the use of broadcast teletext data services. It is now possible to perform two VCR control functions using information contained in broadcast transmissions. The first is the selection of one or more Programmes to be recorded. To make the process of entering the time and channel information into the VCR memory easier and error free, it is possible to programme the VCR from a teletext programme schedule page, where the relevant identification information is held. The second control function is real time switching of the VCR under the control of transmitted data. This enables the desired programme to be recorded despite schedule changes, the VCR being set to record only while the correct broadcast programme label is being transmitted by the broadcaster either as teletext data or as VPS data. Thus, the desired programme may be recorded even when broadcast early or late.

Such transmissions (known as PDC—Programme Delivery Control) are already being provided in the UK and Germany. A VCR equipped with the necessary PDC decoding circuitry is easy to use and gives reliable recording of the chosen items. The technical specification of the PDC system is described in: Specification of the domestic video Programme Delivery Control system (PDC), European Broadcasting Union, August 1990.

There are two different standards for broadcasting the data relevant to each of the two functions. Data required for the above functions is sent on spare TV lines, during the Vertical Blanking Interval (lines 2–22), as either teletext packets or on a dedicated VPS line.

Programme selection information is either incorporated in the displayed programme schedule page as teletext control characters or sent via the teletext extension packets 26. Both methods are based completely on the World System Teletext standard, and the data can be received and decoded using a normal teletext decoder.

Real time switching data, however, may either be sent via the teletext extension packet 8/30/2 or as a special Video Programming Signal (VPS) sent on a dedicated TV line. Teletext and VPS have different data rates (Teletext 6.9375 Mbit/s, VPS 2.5 Mbit/s) and coding schemes as set out in Table 1.

TABLE 1

Difference between teletext and VPS transmissions.

| Characteristic | Teletext | VPS |
| --- | --- | --- |
| Data Amplitude | 0.46 V +/− 10% | 0.5 V +/− 5% |
| Position of Start of Data | 10.2 μs + 1 μs − 0.4 μs | 12.5 μs +/− 1.5 μs |
| Data Rate | 6.9375 Mbits/s | 2.5 Mbit/s |
| Data Coding | Odd Parity, 8/4 Hamming . . . | Biphase |
| Data Clock Synchronization | 16 bit run-in 1010 . . . | 16 bit run-in 1010 . . . |
| Byte Sync Word | 27 hex | 9951 hex |
| TV Lines Containing Data | 2–22, both fields (VBI) | 16, first field |

As a result dual standard video recorders or television sets which are required to be able to detect both teletext and VPS data need two data receiver ICs, to cover the whole of Europe.

It is an object of the invention to provide a data decoder which will allow the decoding of data transmitted with a plurality of data rates and/or encoding formats.

SUMMARY OF THE INVENTION

The present invention provides a data decoder for decoding data transmitted in one or more lines of a field blanking interval of a television signal, said data decoder being capable of decoding data at one of a plurality of data rates and/or encoding formats and comprising control means having a first state which causes the decoder to attempt to detect data transmitted at a first data rate and having a first encoding format and one or more further states which cause the decoder to attempt to detect data transmitted at one or more different data rates and/or different encoding formats.

By providing control means for the decoder it is possible to combine the decoding of data at different data rates and/or different encoding formats in a single decoder rather than having to provide a separate decoder for each differently encoded data stream. Thus, the decoder can have its data slicing circuitry adaptable for different data rates under control of the control means and can be arranged to look for different framing codes, etc., depending on the state of the control means.

In particular the decoder can be used to decode PDC real time switching data in either format (VPS or teletext extension packets) in order to control the functioning of a video recorder, i.e. to record a selected broadcast when it is actually being broadcast even if this does not correspond to the scheduled time, or to switch on a television set when a broadcast begins if the television set had been set to a standby condition where the majority of the circuitry had been switched off with only the timing and real time switching decoding sections operating.

The control means may be arranged to change state in response to the detection of invalid data.

In this way the decoder may be set initially to decode data having a given data rate and encoding format and to switch to attempting to decode data having a different data rate and/or encoding format if it fails to obtain valid data from the received transmission when in the state to which it has been set. Clearly it is possible to construct a decoder which can decode more than two different data signals in which case the control means could be arranged to take a corresponding number of states and to cycle through those states until valid data is decoded.

The control means may be arranged to change state only when invalid data has been detected a given number of times.

In this way isolated instances of errors in the data transmitted will not cause the decoder to look for data of a different type. Otherwise a noisy transmission channel could cause the decoder to be frequently switched by the control means from one data decoding mode to another when, in fact, the type of data being transmitted was not being changed. A convenient value for the given number has been found to be four. This number may, however, be chosen to suit the characteristics of the transmission channel, the anticipated frequency with which the data type transmitted is changed, and the response time required for decoding the data when a data type transmitted is changed.

The control means may be arranged to adopt different states only on given lines during a field blanking interval and on all other lines to adopt a given one of said states.

In the case of teletext and VPS data it is known on which lines the data transmission is to take place. As can be seen from Table 1 VPS is transmitted only on line 16 of the first field, field 0. Consequently it is known that for all the other lines containing data it must be teletext data and that therefore the decoder should be arranged to decode teletext data. On line 16 of field 0, however, the data could be either teletext or VPS and consequently the decoder should be set to the mode which will decode the actual data transmitted. This is achieved, according to the invention, using the control means to adapt the relevant functional blocks within the decoder to the type of data being received.

BRIEF DESCRIPTION OF THE DRAWINGS

The above and other features and advantages of the invention will be apparent from the following description, by way of example, of embodiments of the invention with reference to the accompanying drawings, in which.

DETAILED DESCRIPTION OF THE PREFERRED EMBODIMENTS

Figure 1:
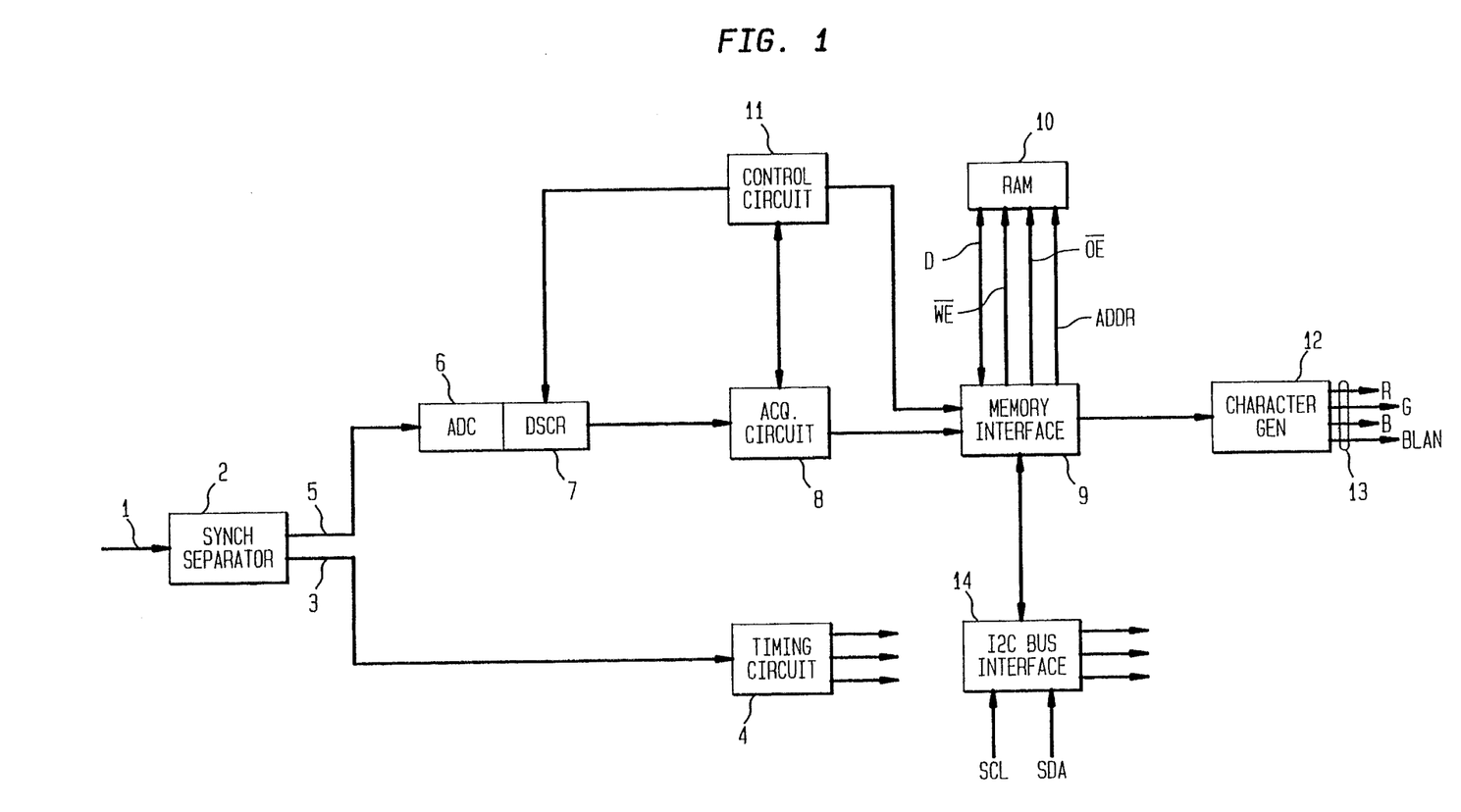
FIG. 1 is a block schematic diagram of a data decoder according to the invention in the form of a decoder for teletext and VPS data.

FIG. 1 shows in block schematic form a data decoder according to the invention in the form of a decoder for teletext and VPS data. As shown in FIG. 1 it has an input 1 to which, in operation, a combined video and blanking signal CBVS is applied. This is fed to the input of an input clamp and synchronising signal separator 2 which produces at an output 3 sychronising signals which are fed to a timing circuit 4 which generates appropriate clock waveforms for the various functional blocks within the decoder. A second output 5 of the input clamp and synchronising signal separator 2 produces a video signal output which contains those lines on which teletext and VPS data is transmitted. This video signal is fed to an analogue to digital converter (ADC) 6. The output of the ADC 6 feeds a data slicer and clock regenerator (DSCR) 7 which produces clock and data signals from the input signal and passes them to an acquisition circuit 8. The acquisition circuit 8 acquires the data from the input signal and passes it through a memory interface 9 to a memory (RAM) 10. The acquisition circuit 8 also receives inputs from the timing circuit 4 and from a control circuit 11 which determines whether the acquisition circuit looks for teletext or VPS data. The control circuit 11 receives and acts upon a signal from the acquisition circuit 8 and produces output signals which control the operation of the DSCR 7, the acquisition circuit 8 and the memory interface 9. The memory interface has an output which feeds a character generator 12 which produces R, G, B, and blanking signals at an output 13. An I2C Bus interface 14 is also connected to the memory interface 9 to enable control by an external microprocessor (not shown).

Apart from the control circuit 11 and its effect on the DSCR 7, acquisition circuit 8, and memory interface 9, the decoder shown in FIG. 1 is implemented as a standard teletext decoder as exemplified by that produced and sold by Philips Semiconductors under the type reference SAA 5246.

Figure 2:
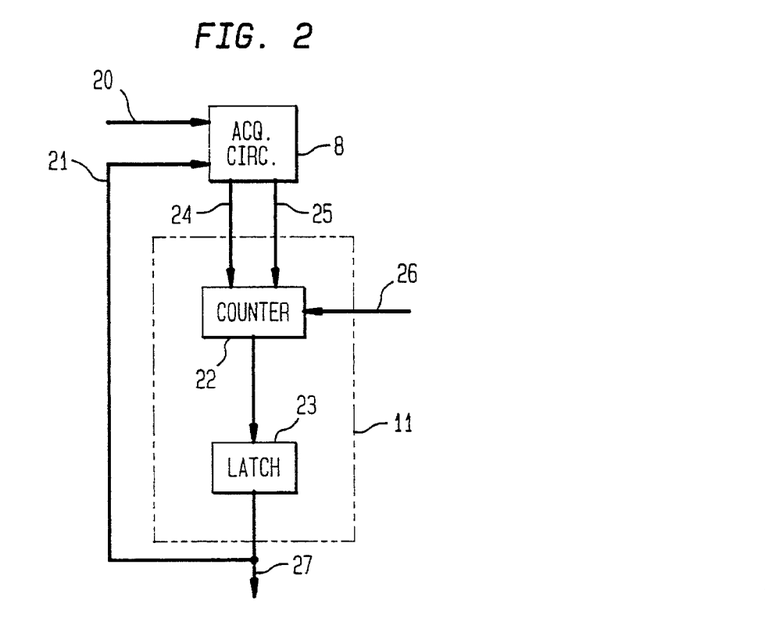
FIG. 2 is a schematic diagram of an embodiment of a control circuit suitable for use as the control circuit of FIG. 1 showing its interaction with the acquisition circuit of FIG. 1.

FIG. 2 shows an embodiment of the control circuit 11 and its interaction with the acquisition circuit 8. The acquisition circuit 8 receives data and clock signals over line 20 from the DSCR 7 and uses these signals to decode the transmitted information in known manner. As the data rate and encoding method used for teletext and VPS differ from each other the acquisition circuit 8 contains the appropriate decoding means for each type of signal. The acquisition circuit consequently has a second input which receives a control signal from the control circuit 11 over a line 21 which signal causes the acquisition circuit to attempt to decode either teletext data or VPS data depending on the value of the signal on line 21.

The control circuit 11 comprises a counter 22 and a latch 23. The counter 22 receives a first signal on a line 24 from the acquisition circuit 8 which is active when valid teletext or VPS data is decoded and causes the counter 22 to be reset to a given state. A second signal on a line 25 is active when valid teletext or VPS data is not decoded by the acquisition circuit 8 and enables the counter 22 to count clock pulses which are applied to an input 26. An output of the counter 22 is connected to a clock input of a latch 23 whose output forms the control signal which is fed to the acquisition circuit 8 over the line 21 and also to an output 27 for connection to the DSCR 7 and memory interface 9.

The operation of the arrangement will now be described starting from the assumption that the control signal on line 21 is in a state which causes the acquisition circuit 8 to attempt to decode teletext signals from the data and clock signals applied over line 20. If a teletext signal is being transmitted then the acquisition circuit will at the appropriate time produce a signal on line 24 which causes the counter 22 to be reset. Consequently the counter output will be unchanged and the latch 23 will not change state. As a result the acquisition circuit 8 will continue to look for and decode teletext data. If, however, teletext data is not being transmitted (or if an error occurs in the teletext data transmitted) then an output will be produced on line 25 which enables the counter 22 to count clock pulses applied at input 26. These clock pulses are at television frame rate and thus the counter will be incremented once each frame. After a preset number of counts the output of the counter will change state and clock the latch 23 causing its output to adopt a different state which is then passed over line 21 to the acquisition circuit 8, and via output 27 to the DSCR circuit 7 and memory interface 9. When the output of latch 23 changes state the control signal causes the acquisition circuit to attempt to decode VPS data. If it successfully decodes the input data on line 20 as valid VPS data it will cause the signal on line 24 to become active and reset the counter 22 and this state will be maintained until valid VPS data ceases to be decoded in which case the reset on line 24 will be removed and the clock enable signal on line 25 will be produced.

The clock signal applied to input 26 is at television frame rate and hence the counter is incremented once each frame as long as valid data is not decoded by the decoder. Once valid data is obtained the counter is reset. This procedure is followed so that if a data signal is lost or corrupted by a brief interfering signal the decoder does not immediately switch over to attempt to decode the other type of data. Thus, for example, the counter is set to count four clock pulses before changing the state of its output so that the temporary loss of signal will not cause the acquisition circuit to switch to decoding the other type of data. The number of clock pulses counted is chosen to enable a relatively fast changeover of the acquisition circuit 8 when the data type transmitted changes while allowing some margin for preventing false changeovers due to interfering signals or noise corrupting the data.

It is known in the case of VPS data that it will be sent on line 16 of field 0 and consequently the control signal will only be operative to cause the decoder to decode VPS data at that period. This is achieved by deriving appropriate timing signals in the timing circuit 4 so that the clock signal applied to input 26 is effective to clock the counter on, for example, line 17 of field 0 to give time for the acquisition circuit 8 to determine whether it has received valid teletext or VPS data on line 16 of field 0 depending on which type of data the control signal on line 21 caused it to look for. Clearly in addition the control signal on line 21 is only effective on line 16 of field 0 as it is known that on all other lines the data being received is teletext data. If, however, VPS data or any other non-teletext data was to be transmitted on any other television lines it would be possible to derive appropriate timing signals using the timing circuit 4 to cause the appropriate control of the acquisition circuit 8.

Figure 3:
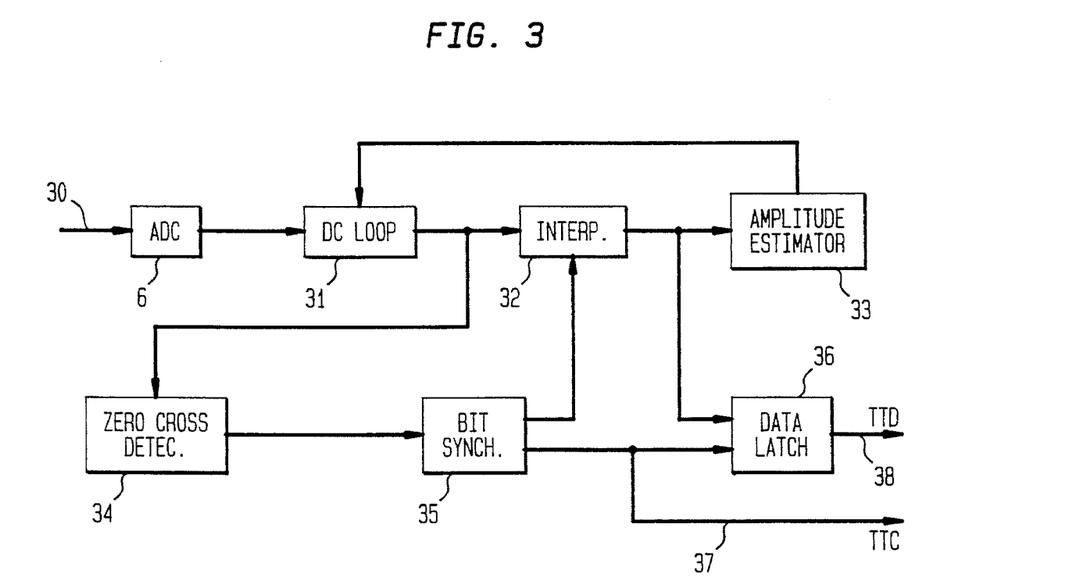
FIG. 3 is a block schematic diagram of the ADC and data slicer and clock regenerator circuit of FIG. 1.

FIG. 3 is a block schematic diagram of the ADC 6 and DSCR 7 and comprises the ADC 6 to which an input video signal is applied at input 30, a DC loop 31, an interpolator 32, an amplitude estimator 33, a zero crossing detector 34, a bit synchroniser 35, and a data latch 36. In operation samples at 13.5 MHz are fed from the ADC 6 to the DC loop 31 which comprises a subtractor unit and performs a level shifting operation on the input samples. The amount subtracted from the input samples is made self adaptive using the output from the amplitude estimator 33. An interpolator 32 performs an interpolation operation on the samples from the DC Loop 31 which are sampled at 13.5 MHz. This is provided since the sampling times are not related to the data clock of either the teletext or VPS data.

The zero crossing detector 34 detects and signals to the bit synchroniser 35 when a zero crossing has occurred and the relative phase of the zero crossing with respect to the sample clock. The bit synchroniser 35 feeds the interpolator 32 to enable the correct data sampling phase to be obtained and generates the teletext clock signal for application to the acquisition circuit 8 at an output 37 and to control a data latch 36 which obtains the teletext data from the interpolator 32. This teletext data is then available for application to the acquisition circuit 8 from an output 38.

Figure 4:
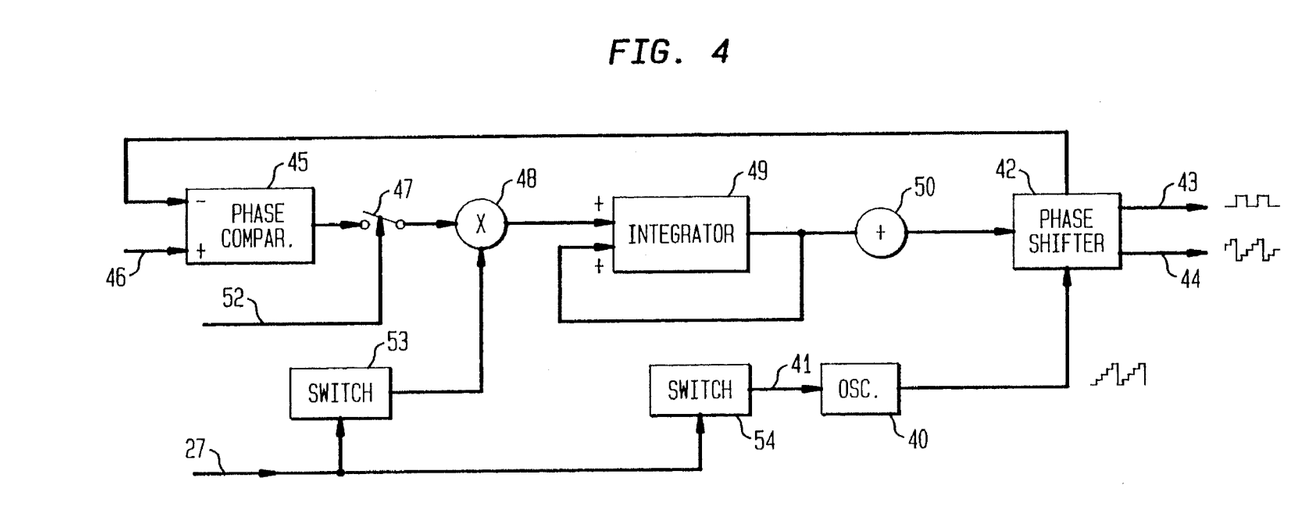
FIG. 4 is a schematic diagram showing an embodiment of a bit synchroniser suitable for use in the clock regenerator circuit of FIG. 3.

The bit synchroniser 35 is shown in greater detail in FIG. 4. It comprises a discrete time oscillator 40 to which is applied a frequency preset over a line 41. A phase shifter 42 provides a regenerated data clock signal at an output 43 and a phase signal for the interpolator 32 at an output 44. The phase shifter 42 has a further output which is connected to a first input of a phase comparator 45, to a second input of which the phase output of the zero crossing detector 34 is applied over a line 46. The phase comparator 45 produces an output representative of the phase error between its two inputs. This output is fed via a switch 47 to a controlled gain circuit 48 whose output feeds an integrator 49. The output of the integrator 49 is applied to the phase shift circuit 42 via a fixed gain stage 50. The switch 47 is controlled over a line 52 which carries a signal from the zero crossing detector 34 to close the switch 47 only when a zero crossing is detected so that the loop is only updated at that time.

The data rate signal is generated by the DTO 40, the phase of which is sampled each time the zero crossing detector 34 finds a transition. As the zero crossing detector 34 also provides a measure of the phase of the signal transition, a comparison can be made (comparator 45) to give a phase error which is used to improve the phase of the locally generated clock at output 43. As the oscillator 40 is a digital ramp generator, detection of digital overflow is sufficient to enable production of the data clock pulses. The digital ramp is supplied to the interpolator 32 to enable it to select the decimation phase used to regenerate peak data samples.

The gain stage 48 is switchable to give an increase in the loop gain for the run-in sequence as the loop is required to find the data phase quickly from that sequence and an appropriate signal is applied over a line 51.

As described thus far the bit sychroniser 35 is as implemented in the teletext decoder type SAA 5246 mentioned hereinbefore. In order to enable the detection of VPS data as well as teletext data, two further switches 53 and 54 are provided which are controlled by the signal produced at output 27 of the control circuit 11. The switch 54 when operated causes a different control word to be applied to the DTO 40 thus changing its nominal frequency and the switch 53 enables different signals to be applied to the gain stage 48 to account for the change in timing and length of the run-in sequences.

Figure 5:
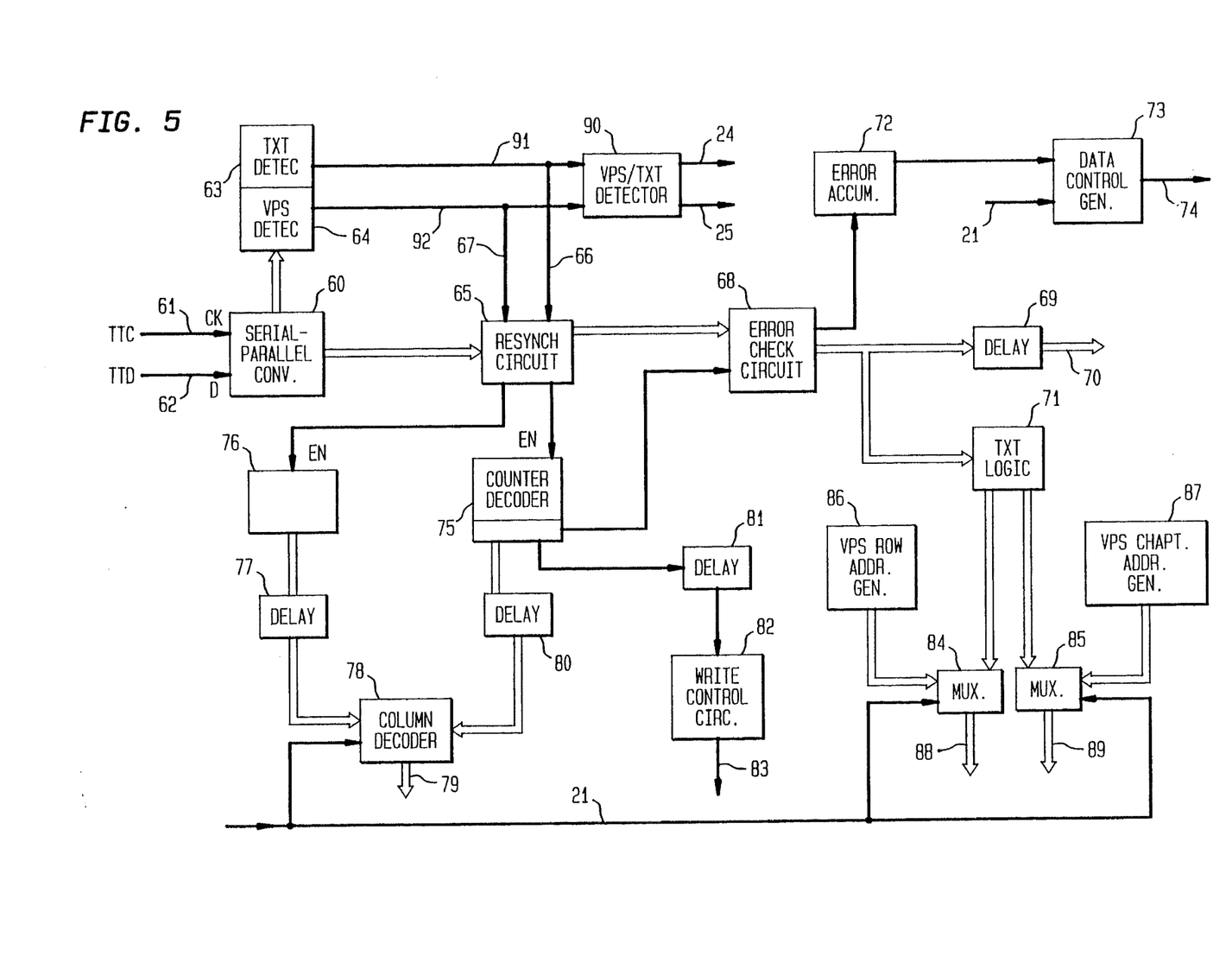
FIG. 5 is a schematic diagram of an embodiment of an acquisition circuit for use in the decoder of FIG. 1.

FIG. 5 is a block diagram of the acquisition circuit 8 which comprises a serial to parallel converter 60 which takes the input data clock and data on lines 61 and 62 from outputs 37 and 38 of the DSCR7 and converts them to parallel data bytes which are fed to a teletext framing code detector 63 and a VPS start code detector 64. The data bytes are also fed to a resynchroniser 65 which is controlled by outputs from the detectors 63 and 64 over lines 66 and 67, respectively. The resynchronised data is fed to an error checking circuit 68 which performs Hamming, Parity, Biphase Decoding and Error Checking functions before feeding data via a delay 69 to an output 70 for storage via the memory interface 9 in the memory 10. The data is also fed to teletext page related logic 71. An output of the error checking circuit 68 is also fed via an error accumulator 72 to a data valid control signal generator 73 which produces a signal at an output 74 signifying whether valid data has been decoded.

The data resynchroniser 65 produces signals for enabling a data byte counter/decoder 75 and a VPS byte counter 76. The VPS byte counter 76 produces an output which is fed via a delay circuit 77 to a column decoder 78 which provides a column address for the memory interface 9 over a path 79. The data byte counter/decoder 75 produces a first output which is fed via a delay circuit 80 to the column decoder 78, a second output which is fed via a delay 81 to a write control circuit 82 which provides a write enable signal on line 83 for application to the memory 10, and a third output which is fed to the error checking circuit 68. The third output will control which error checking procedures are carried out in the circuit 68 since the error protection arrangement for the transmitted data varies according to the function of the data bytes transmitted, for example, in the teletext mode some data bytes are Hamming code protected while others have simple parity bit protection.

The teletext page relates logic circuit 71 which is entirely conventional in form and has two outputs which are fed to first inputs of respective multiplexers 84 and 85. The second input of multiplexer 84 receives VPS row addresses from an address generator 86 while the second input of multiplexer 85 receives VPS chapter addresses from an address generator 87. The multiplexers 84 and 85 provide row and chapter addresses over paths 88 and 89 respectively, to enable writing of the data to appropriate locations in the memory 10.

The column decoder 78 and multiplexers 84 and 85 are controlled by the signal produced by the control circuit 11 and fed to the acquisition circuit 8 over the line 21 (FIG. 2). This signal is also fed to the data valid generator 73.

The outputs of the teletext framing code detector 63 and VPS start code detector 64 are also fed over lines 91 and 92 to a VPS/teletext detector 90 which produces the signals to the control circuit 11 on lines 24 and 25.

Figure 6:
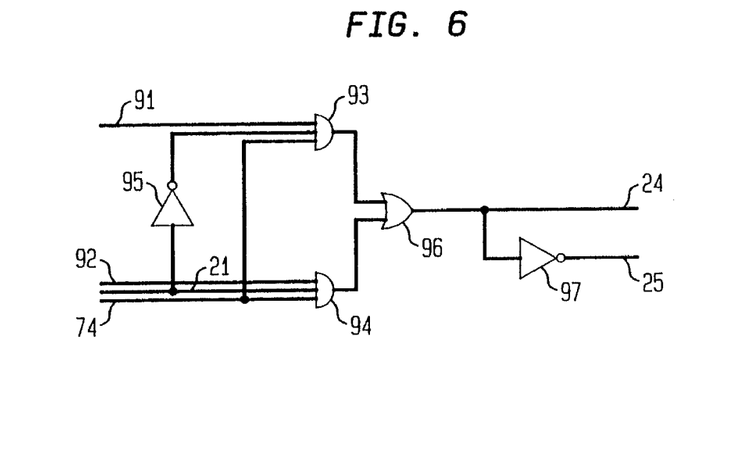
FIG. 6 is a block schematic diagram of a teletext/VPS detector.

FIG. 6 shows an embodiment of the VPS/teletext detector 90. It comprises first and second AND gates 93 and 94 to first inputs of which the lines 91 and 92 are connected respectively. Line 21 carries the VPS mode signal. The signal on line 21 is applied to a second input of AND gate 94 and via an inverter 95 to a second input of AND gate 93. The data valid signal on line 74 is applied to third inputs of the AND gates 93 and 94. As a result, if a valid teletext framing code is detected when the acquisition circuit is set to look for teletext signals (by the signal on line 21), then AND gate 93 will produce an output, while if a valid VPS start code is detected when the acquisition circuit is set to look for VPS signals (the signal on line 21 adopting the other state), then AND gate 94 will produce an output. The outputs of AND gates 93 and 94 are fed to respective inputs of an OR gate 96 which will as a result produce an output on line 24 if either of AND gates 93 and 94 produce outputs. Thus, if either valid teletext data is detected when looking for teletext data or valid VPS data is detected when looking for VPS data, then the signal on line 24 will be effective to reset the counter 22 (FIG. 2). The output of OR gate 96 is also connected via an inverter 97 to line 25 and as a result the counter clock will be enabled if either no valid data is detected or if teletext data is detected when the acquisition circuit is set to decode VPS data or vice versa.

Figure 7:
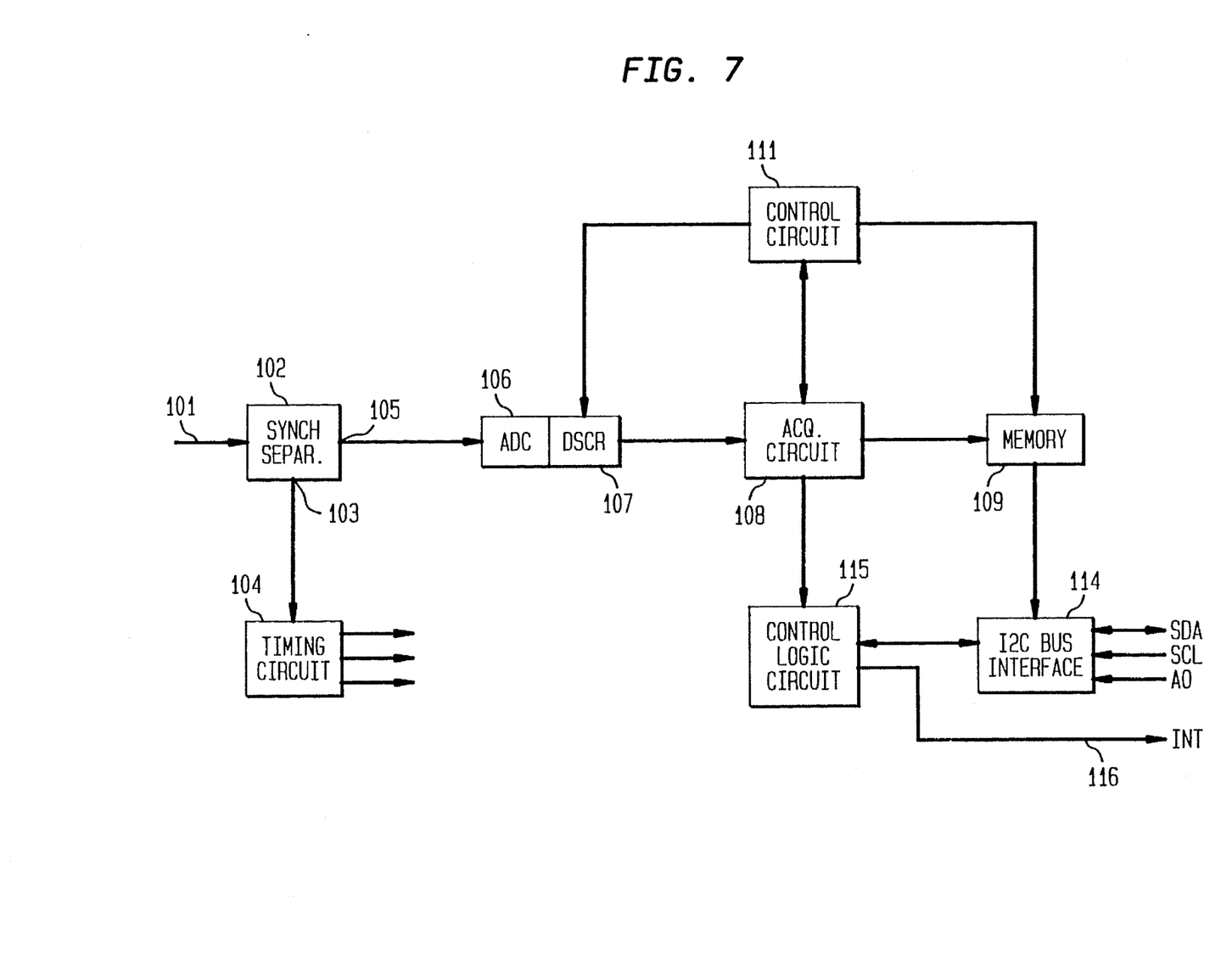
FIG. 7 is a block schematic diagram of a data decoder according to the invention for decoding real time switching signals for television sets or video recorders in the form of VPS data or teletext extension packets.

FIG. 7 shows in block schematic form a decoder for VPS data and teletext data which is arranged to acquire and store only data relevant to real time switching of video recorders and/or television sets, i.e. VPS data and teletext extension packet 8/30/2. It comprises an input 101 which is connected to an input clamp and synchronising signal separator 102 having a first output 103 connected to a timing circuit 104 and a second output 105 connected to an ADC 106. As with the arrangement described with reference to FIG. 1 the timing circuit 104 generates the appropriate clock waveforms for the other functional blocks shown. The output of the ADC 106 feeds a data slicer and clock regenerator circuit (DSCR) 107 which produces clock and data signals from the input data samples and feeds them to an acquisition circuit 108. The acquisition circuit 108 produces a first output which is fed to a memory interface and internal memory 109 to provide appropriate addressing signals and decoded data for storage in the memory. An I2C Bus interface 114 is provided to enable interaction between the decoder and an external microprocessor, the I2C Bus interface accessing the memory 109 and a control logic circuit 115 which indicates error free reception of VPS or packet 8/30/2 data on an output 116. A control circuit 111, which takes the same form as that of control circuit 11 in the embodiment of FIG. 1, produces outputs controlling the operation of the DSCR 107, acquisition circuit 108, and memory interface 109.

The arrangement of FIG. 7 operates in the same way as that of FIG. 1 except that, since only real time switching data is acquired, the acquisition circuit is simpler, a small internal memory only is required since teletext page display information is not required to be stored and no character generator is required since no data is displayed. In other respects the functional blocks may take the same form in each embodiment.

What is claimed is:

1. A data decoder for decoding data occurring at a plurality of data rates and/or encoding formats and transmitted in one or more lines of a field blanking interval of a television signal, said data decoder comprising control means having a first state which causes the decoder to attempt to detect data transmitted at a first data rate and having a first encoding format and having one or more further states which cause the decoder to attempt to detect data transmitted at one or more different data rates and/or different encoding formats, and means for detecting invalid data, and wherein said control means is arranged to change state in response to the detection of invalid data.

2. A data decoder as claimed in claim 1 wherein the control means is arranged to change state only when invalid data has been detected a given number of times.

3. A data detector as claimed in claim 1 wherein said control means is arranged to adopt different states only on given lines during a field blanking interval and on all other lines is arranged to adopt a given one of said states.

4. A data decoder for decoding data occurring at a plurality of data rates and/or encoding formats and transmitted in one or more lines of a field blanking interval of a television signal, said data decoder comprising:

control means having a first state which signals the decoder to attempt to detect first data transmitted at a first data rate and having a first encoding format and having a second state which signals the decoder to attempt to detect second data transmitted at a different data rate and/or different encoding format, and means for detecting whether the decoder is set to attempt to detect said first data or said second data and for signaling the control means accordingly, and wherein said control means switches state in response to said signaling if it is in a state to signal the decoder to attempt to decode first data when second data is present, and vice versa.

5. A data detector as claimed in claim 2 wherein said control means is arranged to adopt different states only on given lines during a field blanking interval and on all other lines is arranged to adopt a given one of said states.

6. A data decoder as claimed in claim 1 wherein said control means has two states.

7. A data decoder as claimed in claim 2 wherein said control means has two states.

8. A data decoder as claimed in claim 3 wherein said control means has two states.

9. A data decoder for decoding data having at least first and second distinct characteristics and transmitted in one or more lines of a field blanking interval of a television signal, said data decoder comprising:

an input terminal for receiving a combined blanking and video television signal having data to be decoded, a synchronizing signal separator circuit coupled to said input terminal and having output means for supplying synchronizing signals and video signals, separated from the combined television signal, an acquisition circuit responsive to data and clock signals and including means for decoding data having said first and second distinct characteristics, a data slicer and clock regenerator (DSCR) circuit coupled to said synchronizing signal separator circuit and to said acquisition circuit, a memory device for storing output data decoded by said acquisition circuit, and a control circuit arranged to control the DSCR circuit, the acquisition circuit and the storage of decoded data in said memory, said control circuit producing a control signal for the acquisition circuit having at least first and second states corresponding to data transmitted with said at least first and second characteristics, respectively, and wherein, if said control circuit is producing said first state of the control signal while said acquisition circuit receives data with said second characteristic, the control circuit will change state to produce said second state of the control signal, and vice versa.

10. A data decoder as claimed in claim 9 wherein said first and second distinct characteristics of the data correspond to first and second different data rates, respectively.

11. A data decoder as claimed in claim 9 wherein said first and second distinct characteristics of the data correspond to first and second different encoding formats, respectively.

12. A data decoder as claimed in claim 9 wherein said first and second distinct characteristics of the data correspond to first and second different data rates, respectively, and first and second different encoding formats, respectively.

13. A data decoder as claimed in claim 9 wherein said control circuit is arranged to change state only if a mismatch occurs a given number of times between the data being decoded in the acquisition circuit and the state of the control signal produced by the control circuit.

14. A data decoder as claimed in claim 13 wherein said control circuit is arranged to adopt different states only on given lines during a field blanking interval and on all other lines is arranged to adopt a given one of said states.

15. A data decoder as claimed in claim 9 wherein the data with said first and second characteristics comprise teletext and VPS data, respectively.

16. A data decoder as claimed in claim 15 wherein said acquisition circuit further comprises a logic circuit operative as a teletext/VPS detector for supplying further control signals to said control circuit.

17. A data decoder as claimed in claim 13 wherein said control circuit comprises;

a counter having a reset input and an enable input coupled to receive signals from said acquisition circuit, means for supplying clock pulses to a further input of the counter, and a latch circuit having an input coupled to an output of the counter and an output coupled to a control input of the acquisition circuit to supply thereto said control signal.

18. A data decoder as claimed in claim 4 arranged to decode teletext and VPS data.

19. A data decoder as claimed in claim 18 wherein said control means comprises a latch circuit which latches the control means into the first or second state until a mismatch occurs between said first or second state and the type of data present in the decoder.

20. The data decoder as claimed in claim 9, wherein said acquisition circuit is responsive to said control signal to attempt to decode data transmitted with said first characteristic for said first state of the control signal and to attempt to decode data transmitted with said second characteristic for said second state of the control signal.

21. A data decoder as claimed in claim 9 wherein said control circuit comprises;

a counter having a reset input and an enable input coupled to receive reset and enable signals from said acquisition circuit, means for supplying clock pulses to a further input of the counter, and a latch circuit having an input coupled to an output of the counter and an output coupled to a control input of the acquisition circuit to supply thereto said control signal.

* * * * *